(12) United States Patent  
Rudy (10) Patent No.: US 8,965,570 B2
(45) Date of Patent: Feb. 24, 2015

(54) SYSTEM AND METHOD FOR REMOTELY DISPENSING MEDIA DISCS

(75) Inventor: Alan T. Rudy, New Albany, OH (US)

(73) Assignee: NCR Corporation, Duluth, GA (US)

( * ) Notice: Subject to any disclaimer, the term of this patent is extended or adjusted under 35 U.S.C. 154(b) by 0 days.

(21) Appl. No.: 12/114,259

(22) Filed: May 2, 2008

(65) Prior Publication Data

US 2009/0276085 A1 Nov. 5, 2009

(51) Int. Cl.
*A47F 1/04* (2006.01)
*G06F 17/00* (2006.01)
*G07F 11/54* (2006.01)
*G07F 9/02* (2006.01)
*G07F 11/16* (2006.01)
*G07F 17/30* (2006.01)
*G11B 17/22* (2006.01)

(52) U.S. Cl.
CPC ............... *G07F 11/54* (2013.01); *G07F 9/026* (2013.01); *G07F 11/165* (2013.01); *G07F 17/30* (2013.01); *G11B 17/225* (2013.01)
USPC ......................................... 700/243; 700/242

(58) Field of Classification Search
CPC .................................................... G11B 17/225
USPC ................................................. 700/231–244
See application file for complete search history.

(56) References Cited

U.S. PATENT DOCUMENTS

| | | | |
|---|---|---|---|
| 3,976,301 A * | 8/1976 | Corbett et al. | 369/35.01 |
| 4,519,522 A | 5/1985 | McElwee | |
| 4,608,679 A * | 8/1986 | Rudy et al. | 369/30.43 |
| 4,668,150 A | 5/1987 | Blumberg | |
| 4,814,592 A | 3/1989 | Bradt et al. | |
| 4,907,889 A * | 3/1990 | Simone | 360/92.1 |
| 4,937,690 A * | 6/1990 | Yamashita et al. | 360/92.1 |
| 5,042,686 A | 8/1991 | Stucki | |
| 5,056,073 A * | 10/1991 | Fitzgerald et al. | 369/30.73 |
| 5,128,912 A * | 7/1992 | Hug et al. | 369/30.61 |
| 5,143,193 A | 9/1992 | Geraci | |
| 5,159,560 A | 10/1992 | Newell | |
| 5,206,814 A | 4/1993 | Cahlander et al. | |
| 5,219,094 A * | 6/1993 | Labriola | 221/76 |

(Continued)

FOREIGN PATENT DOCUMENTS

CA 1207411 A1 7/1986
DE 202004005215 U1 7/2004

(Continued)

OTHER PUBLICATIONS

Datarius Indent Code Inspector Techincal Specification, www.datarius.com, 2008.

(Continued)

*Primary Examiner* — Michael K Collins
(74) *Attorney, Agent, or Firm* — Joseph P. Mehrle (57) ABSTRACT

A system for dispensing media discs includes a storage system comprising a plurality of shelves for storing the media discs, a dispense system for dispensing the media discs to consumers, a disc transfer system for moving the media discs from the disc storage system to the dispense system, a control system operably connected to the disc transfer system to selectively activate the disc transfer system to move the media discs from the disc storage system to the dispense system, and a user interface system operably connected to the control system. The shelves are configured to store uncovered media discs.

14 Claims, 9 Drawing Sheets

(56) References Cited

U.S. PATENT DOCUMENTS

| | | | |
|---|---|---|---|
| 5,319,621 A * | 6/1994 | Amar | 369/30.33 |
| 5,320,219 A | 6/1994 | Ward | |
| 5,418,763 A | 5/1995 | Ichikawa et al. | |
| 5,431,520 A * | 7/1995 | Brugger | 414/277 |
| 5,523,551 A | 6/1996 | Scott | |
| 5,528,566 A | 6/1996 | McGee et al. | |
| 5,633,839 A * | 5/1997 | Alexander et al. | 700/234 |
| 5,641,092 A * | 6/1997 | Scott | 221/134 |
| 5,647,505 A | 7/1997 | Scott | |
| 5,673,195 A | 9/1997 | Schwartz et al. | |
| 5,724,321 A * | 3/1998 | Vishlitzky | 369/30.3 |
| 5,726,898 A * | 3/1998 | Jacobs | 700/231 |
| 5,748,485 A | 5/1998 | Christiansen et al. | |
| 5,870,357 A * | 2/1999 | Dondero | 369/30.55 |
| 5,949,876 A | 9/1999 | Ginter et al. | |
| 5,988,431 A * | 11/1999 | Roe | 221/132 |
| 6,009,057 A | 12/1999 | Furukawa et al. | |
| 6,026,374 A | 2/2000 | Chess | |
| 6,118,450 A * | 9/2000 | Proehl et al. | 715/810 |
| 6,123,020 A * | 9/2000 | Wolfer et al. | 101/35 |
| 6,163,511 A * | 12/2000 | De Vries | 369/30.77 |
| 6,201,771 B1 | 3/2001 | Otsuka et al. | |
| 6,243,328 B1 * | 6/2001 | Fenner et al. | 1/1 |
| 6,327,230 B1 | 12/2001 | Miller | |
| 6,327,236 B2 | 12/2001 | Yamamiya | |
| 6,356,971 B1 | 3/2002 | Katz et al. | |
| 6,488,462 B1 * | 12/2002 | Williams | 414/277 |
| 6,587,031 B1 | 7/2003 | Daugherty et al. | |
| 6,622,064 B2 | 9/2003 | Bartholomew et al. | |
| 6,665,580 B1 | 12/2003 | Susnjara | |
| 6,671,575 B2 * | 12/2003 | Baik | 700/218 |
| 6,674,711 B1 * | 1/2004 | Shiba | 369/178.01 |
| 6,748,296 B2 | 6/2004 | Banerjee et al. | |
| 6,997,375 B1 | 2/2006 | Green et al. | |
| 7,027,383 B2 | 4/2006 | Van Woudenberg | |
| 7,110,544 B2 | 9/2006 | Gotoh et al. | |
| 7,151,718 B2 * | 12/2006 | Schumacher | 369/30.33 |
| 7,181,313 B2 * | 2/2007 | Studebaker et al. | 700/214 |
| 7,221,643 B2 | 5/2007 | Spruit et al. | |
| 7,234,609 B2 | 6/2007 | DeLazzer | |
| 7,366,586 B2 * | 4/2008 | Kaplan et al. | 700/241 |
| 7,503,494 B2 | 3/2009 | Shimada et al. | |
| 7,844,547 B2 | 11/2010 | Amos | |
| 7,854,332 B1 * | 12/2010 | Clausen | 211/41.12 |
| 2002/0046122 A1 * | 4/2002 | Barber et al. | 705/17 |
| 2004/0016620 A1 | 1/2004 | Davis | |
| 2004/0044697 A1 | 3/2004 | Nixon | |
| 2004/0099734 A1 | 5/2004 | Barton | |
| 2004/0158871 A1 | 8/2004 | Jacobson | |
| 2004/0162633 A1 | 8/2004 | Kraft | |
| 2004/0254676 A1 * | 12/2004 | Blust et al. | 700/231 |
| 2005/0024996 A1 | 2/2005 | Schumacher | |
| 2005/0096936 A1 | 5/2005 | Lambers | |
| 2005/0192829 A1 | 9/2005 | Zandt et al. | |
| 2005/0230410 A1 | 10/2005 | DeLazzer et al. | |
| 2005/0240958 A1 | 10/2005 | Nguyen | |
| 2006/0254862 A1 | 11/2006 | Hoersten | |
| 2006/0259190 A1 | 11/2006 | Hale | |
| 2006/0259191 A1 | 11/2006 | Lowe | |
| 2006/0259192 A1 | 11/2006 | Lowe | |
| 2006/0259262 A1 | 11/2006 | Kuehnrich | |
| 2006/0260875 A1 | 11/2006 | Hoersten | |
| 2006/0265101 A1 | 11/2006 | Kaplan | |
| 2006/0272922 A1 | 12/2006 | Hoersten | |
| 2007/0050266 A1 | 3/2007 | Barber | |
| 2007/0051802 A1 | 3/2007 | Barber et al. | |
| 2007/0174140 A1 | 7/2007 | Noonan | |
| 2007/0252003 A1 | 11/2007 | Goldring et al. | |
| 2008/0114632 A1 | 5/2008 | Partee et al. | |
| 2009/0073847 A1 | 3/2009 | Chpakovski | |
| 2009/0276085 A1 | 11/2009 | Rudy | |
| 2009/0276086 A1 | 11/2009 | Rudy | |
| 2009/0276087 A1 | 11/2009 | Murray et al. | |
| 2009/0326708 A1 | 12/2009 | Rudy et al. | |

FOREIGN PATENT DOCUMENTS

| | | |
|---|---|---|
| DE | 202004005815 U1 | 8/2005 |
| DE | 202004005818 U1 | 8/2005 |
| EP | 2113891 A1 | 11/2009 |
| JP | S59177759 A | 10/1984 |
| JP | H02060948 A | 3/1990 |
| JP | H02141893 U | 11/1990 |
| JP | H05054510 A | 3/1993 |
| JP | H0950665 A | 2/1997 |
| JP | 2008040920 A | 2/2008 |
| WO | WO0072160 A1 | 11/2000 |

OTHER PUBLICATIONS

Xiris ID3500 Ident Code Verification System, http://www.kammann.com/enh/pdf/Xiris-ID3500.pdf.

Xiris DO1600 Disc Orientation System Technical Specification, www.xiris.com, Apr. 2006.

BBC News, Title: "Colour barcode system hit DVDs", http://newsvote.bbc.co.uk/mpapps/pagetools/print/news.bbc.co.uk/2/hi/technology/6570871.stm, 2007.

* cited by examiner

SYSTEM AND METHOD FOR REMOTELY DISPENSING MEDIA DISCS

CROSS-REFERENCE TO RELATED APPLICATIONS

Not Applicable

STATEMENT REGARDING FEDERALLY SPONSORED RESEARCH

Not Applicable

REFERENCE TO MICROFICHE APPENDIX

Not Applicable

FIELD OF THE INVENTION

The field of the present invention generally relates to systems and methods for dispensing media discs and, more particularly, a kiosk-based distribution system and method for DVDs, CDs, video game discs, and the like.

BACKGROUND OF THE INVENTION

Consumers typically want their entertainment on demand. The movie and video game rental industry has been dominated by brick-and-mortar stores. These brick-and-mortar stores are generally successful at meeting this demand by stocking large quantities of each new release and many older releases. However, the store locations may not be convenient for all consumers.

Internet-based rental services are also known. These services permit consumers to order videos via the internet and receive and return the videos via overnight couriers or other delivery services. However, the consumers must wait at least one day until they receive the videos even if they are currently in stock.

Pay-per View video services are also known. These services permit cable television and/or satellite television customers to select and immediately view a video. However, these services offer only limited selections to viewers during any given period of time.

Remote dispensing machines or kiosks for DVDs are also known. These kiosks enable the DVDs to be dispensed at locations convenient for consumers. To date, however, these machines are limited in the number of discs that can be stocked at any one time and thus may not have a movie or other digitally recorded entertainment that consumers demand when they demand it. Accordingly, there is a need in the art for improved systems and methods for handling transactions involving media discs.

SUMMARY OF THE INVENTION

The present invention provides systems and methods for dispensing media discs which overcomes at least some of the above-noted problems of the related art. Disclosed herein is a system for dispensing media discs comprising, in combination, a storage system comprising a plurality of shelves for storing the media discs, a dispense system for dispensing the media discs to consumers, a disc transfer system for moving the media discs from the disc storage system to the dispense system, a control system operably connected to the disc transfer system to selectively activate the disc transfer system to move the media discs from the disc storage system to the dispense system, and a user interface system operably connected to the control system. The shelves are configured to store uncovered media discs.

Also disclosed herein is a system for dispensing media discs comprising, in combination, a storage system comprising a plurality of shelves for storing the media discs, a dispense system for dispensing the media discs to consumers, a disc transfer system for moving the media discs from the disc storage system to the dispense system, a control system operably connected to the disc transfer system to selectively activate the disc transfer system to move the media discs from the disc storage system to the dispense system, and a user interface system operably connected to the control system. The storage system encircles the disc transfer system.

Also disclosed herein is a system for dispensing media discs comprising, in combination, a storage system comprising a plurality of shelves for storing the media discs, a dispense system for dispensing the media discs to consumers, a disc transfer system for moving the media discs from the disc storage system to the dispense system, a control system operably connected to the disc transfer system to selectively activate the disc transfer system to move the media discs from the disc storage system to the dispense system, and a user interface system operably connected to the control system. The storage unit is drum-shaped.

From the foregoing disclosure and the following more detailed description of various preferred embodiments it will be apparent to those skilled in the art that the present invention provides a significant advance in the technology and art of systems and methods for remotely dispensing media discs. Particularly significant in this regard is the potential the invention affords for providing large storage capacities for media discs. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein.

Figure 1:
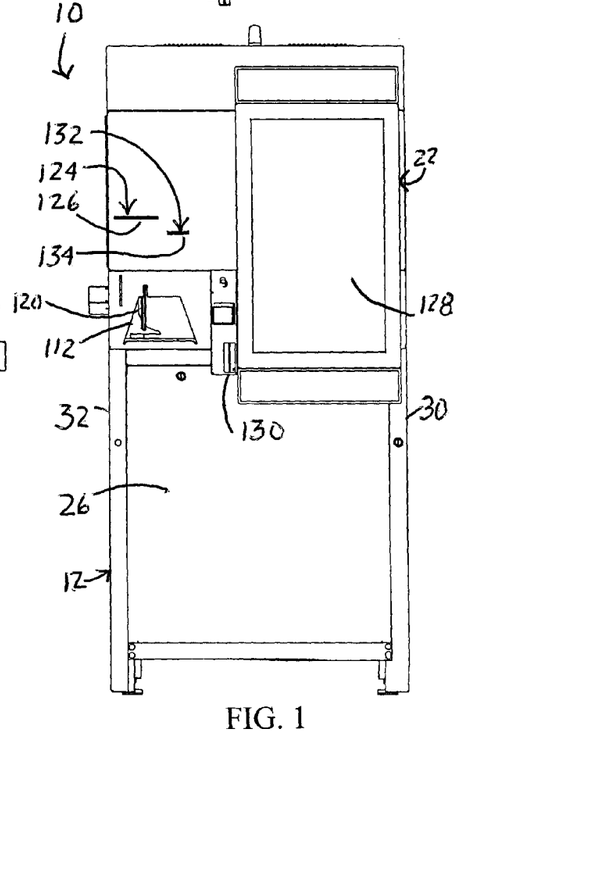
FIG. 1 is a front elevational view of a kiosk for dispensing media discs according to the present invention.
Figure 2:
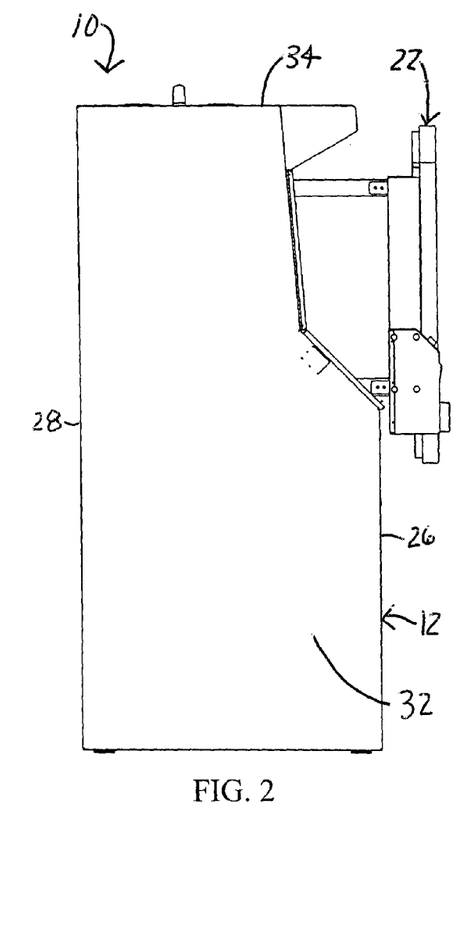
FIG. 2 is a right side elevational view of the kiosk of FIG. 1.
Figure 3:
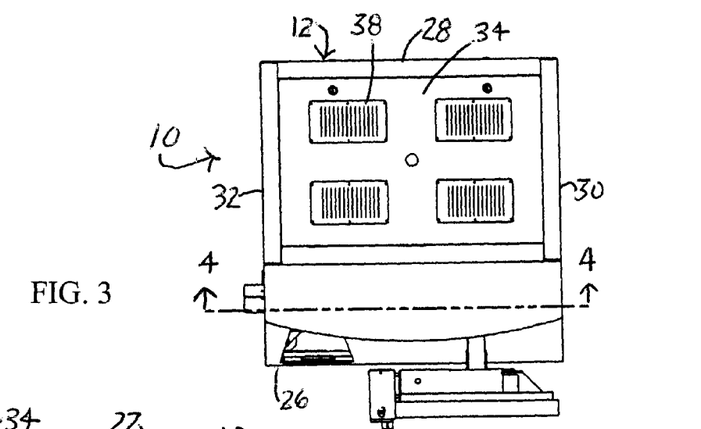
FIG. 3 is a top plan view of the kiosk of FIGS. 1 and 2.
Figure 4:
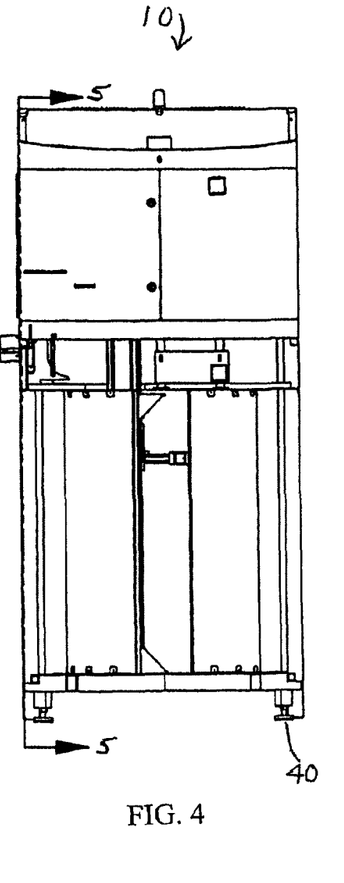
FIG. 4 is a sectional view taken along line 4-4 of FIG. 3, wherein some components are removed for clarity.
Figure 5:
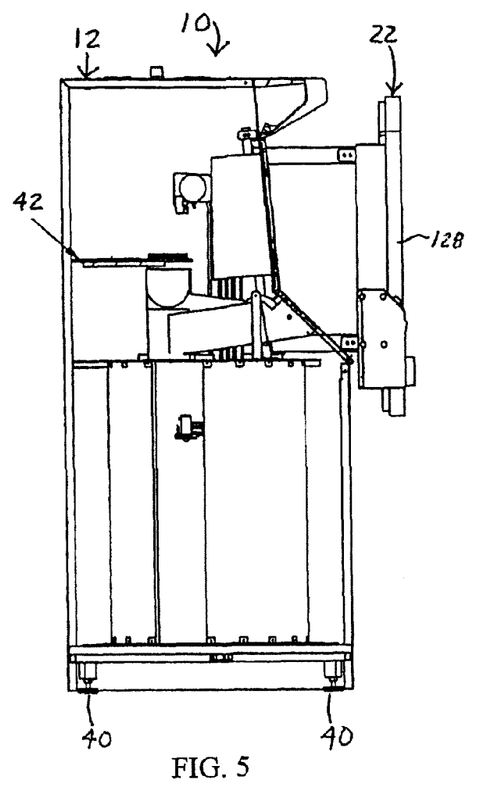
FIG. 5 is a sectional view taken along line 5-5 of FIG. 4, wherein some components are removed for clarity.
Figure 6:
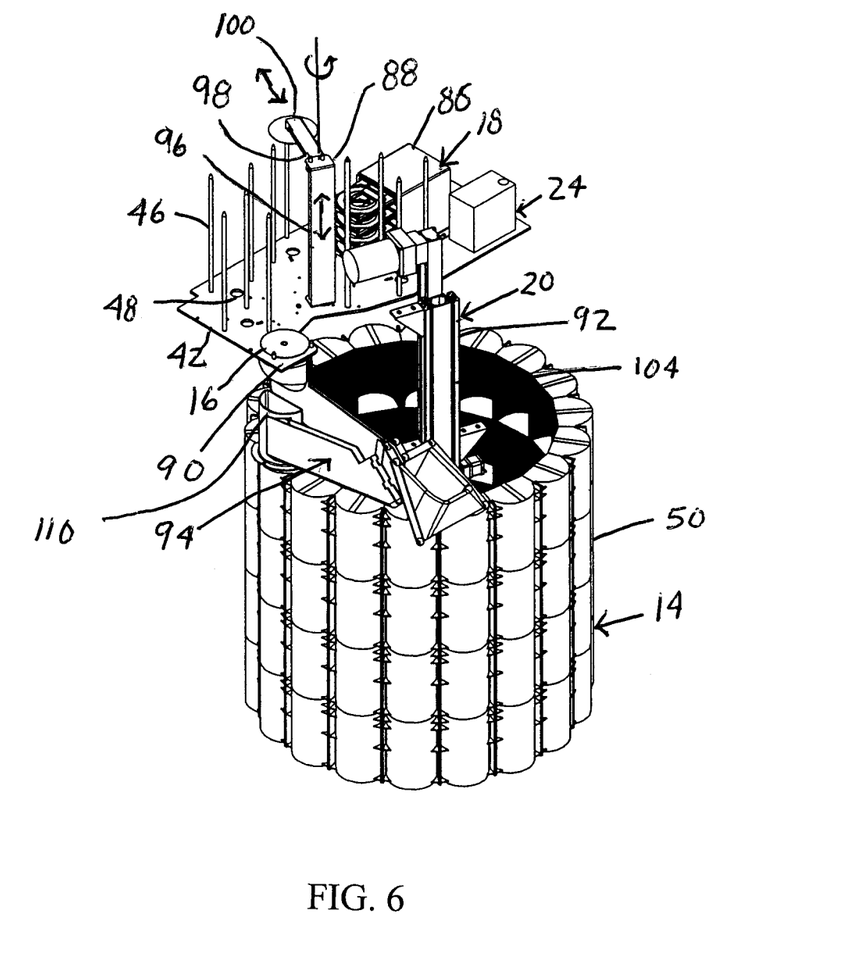
FIG. 6 is a perspective view of internal systems if the kiosk of FIGS. 1 to 5, wherein an exterior housing is removed for clarity.
Figure 7:
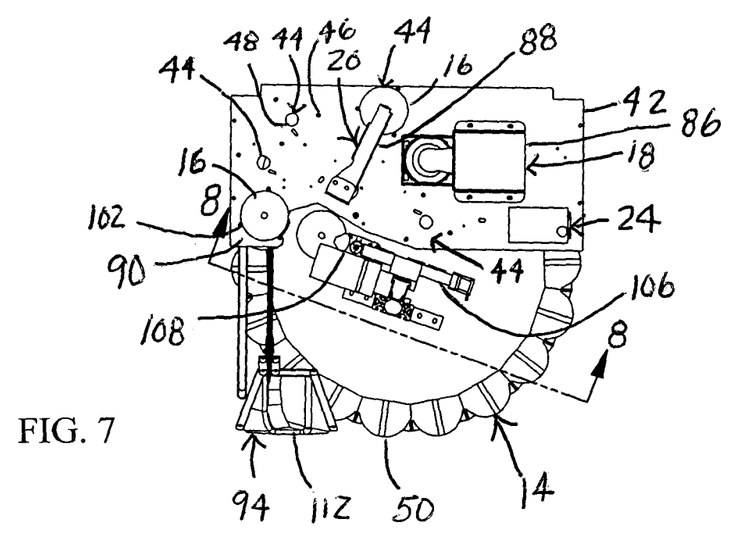
FIG. 7 is a top plan view of the internal systems of FIG. 6.
Figure 8:
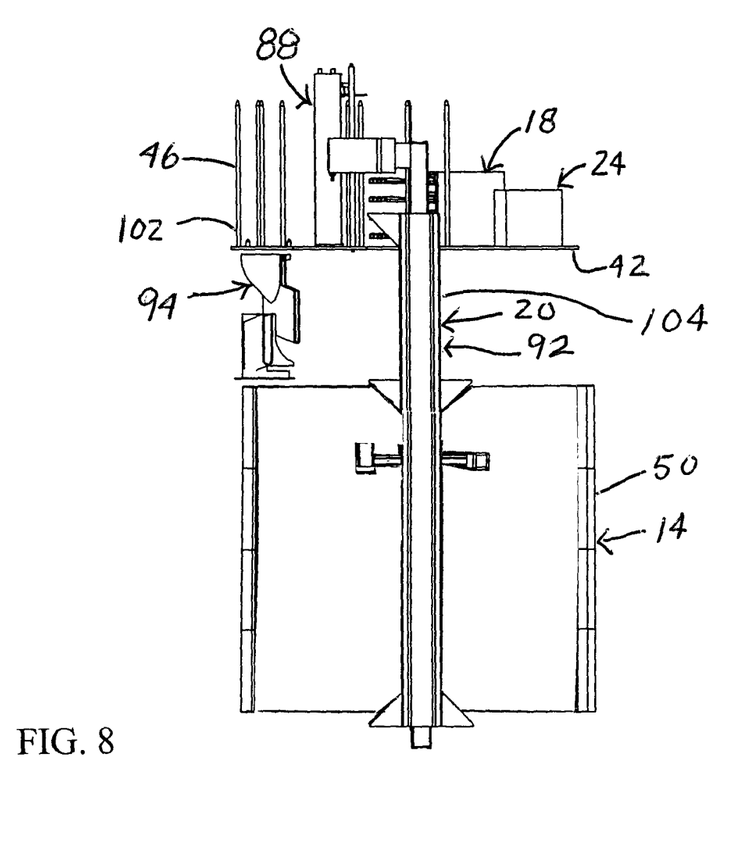
FIG. 8 is a sectional view taken along line 8-8 of FIG. 7.

It should be understood that the appended drawings are not necessarily to scale, presenting a somewhat simplified representation of various preferred features illustrative of the basic principles of the invention. The specific design features of a kiosk as disclosed herein, including, for example, specific dimensions, orientations, locations, and shapes will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the powered adjustable seat assembly illustrated in the drawings. In general, up or upward refers to an upward direction within the plane of the paper in FIG. 1 and down or downward refers to a downward direction within the plane of the paper in FIG. 1. Also in general, fore or forward refers to a direction out of the plane of the paper in FIG. 1 and aft or rearward refers to a direction into the plane of the paper in FIG. 1.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved systems and methods disclosed herein. The following detailed discussion of various alternative and preferred embodiments will illustrate the general principles of the invention with reference to a preferred embodiment of a system and method for dispensing prerecorded DVDs or other media discs. Other embodiments suitable for other applications will be apparent to those skilled in the art given the benefit of this disclosure.

In this specification and the claims, the term "media disc" is used to mean an optical storage format for digital information having a primary use of video, audio, and/or data storage such as, for example, a DVD (also known as a "Digital Versatile Disc" or a "Digital Video Disc") including but not limited to different embodiments such as DVD-R, DVD+R, DVD-RAM, DVD-RW and DVD+RW, and the like and also including but limited to different optical formats such as SD DVD, HD DVD, BLU-RAY DVD, and the like, a CD (also known as a "Compact Disc") including but not limited to CD-ROM, CD-R, CD-RW, SACD, VCD, SVCD, PhotoCD, Picture CD, CDi, Enhanced CD, and the like, and other like discs. A typical media disc is used to store media such as, movies, music, video games, software, or the like. By way of example, a standard CD is a disc of almost pure polycarbonate plastic, having a diameter of about 120 mm and a thickness of about 1.2 mm. Mini CDs have diameters ranging from about 60 to about 80 mm. Media discs typically have a circular outer edge and a concentric center opening. In this specification and the claims, the term "prerecorded media disc" is used to mean a media disc that has already been recorded with information such that it operates as read only memory (ROM). In this specification and the claims, the term "uncovered media disc" is used to mean a media disc that is not located in a protective case, cover, sleeve or the like such that it is in a condition to be directly inserted into a standard optical disc drive (ODD) for reading.

Referring now to the drawings, FIGS. 1 to 8 illustrate a remote dispensing machine or kiosk 10 for dispensing media discs according to a preferred embodiment of the present invention. The illustrated kiosk 10 includes a cabinet or enclosure 12, a disc storage system 14 located within the enclosure 12 for storing a plurality of prerecorded media discs 16, a disc identification system 18 for identifying the prerecorded media discs 16, a disc transfer system 20 for moving the media discs 16 between desired locations within the enclosure 12 such as between the disc identification system 18 and the disc storage system 14, a user interface system 22 for interfacing between a consumer and the kiosk 10, and a control system 24 for automatically operating the various systems of the kiosk 10.

The illustrated enclosure 12 is generally rectangular shaped having opposed front and back sides 26, 28, and opposed left and right sides 30, 32 connecting the front and back sides 26, 28. The illustrated enclosure also includes a top end 34 and a bottom end 36. The illustrated front side 26 is provided with portions of the user interface system 22 as described in more detail hereinafter. The illustrated top end 34 is provided with vents 38 for the intake and discharge of air. The illustrated bottom end 36 is provided with a support structure having a plurality of adjustable feet or supports 40 so that the enclosure 12 can be adjusted to be substantially level. The illustrated sides 26, 28, 30, 32, 34 form a hollow interior cavity for the various systems and components as described in more detail hereinafter.

Located within the enclosure 12 above the disc storage system 14 is a horizontally disposed stationary shelf or platform 42. The illustrated shelf 42 is located at a rear portion of the enclosure 12 and is sized and shaped to permit the disc transfer system 20 to operate between the shelf 42 and the disc storage system 14 as described in more detail hereinafter. The illustrated shelf 42 is also provided with four disc holding locations 44. It is noted that alternatively a greater or lesser of holding locations 44 can alternatively be utilized. Each holding location 44 is adapted for temporarily holding a stack of the uncovered media discs 16. The illustrated holding locations 44 each have three vertically extending rods 46 equally spaced about the periphery of the media discs 16 so that a stack of media discs 16 can be secured within the rods 46 and an opening 48 in the shelf 42 sized and shaped to cooperate with the central opening in the media discs 16 so that the media discs 16 can more easily picked up from the shelf 42 by the transfer system 20, particularly when a single media disc 16 remains on the shelf 42. It is noted that the holding locations 44 can alternatively have any other suitable configuration. Configured in this manner, the inventory of the kiosk 10 can be serviced by removing stacks of the uncovered media discs 16 from the holding locations 44 through an access door in the back side 28 of the kiosk 10. Likewise, the inventory of the kiosk 10 can be serviced by inserting stacks of the uncovered media discs 16 into the holding locations 44 through the access door in the back side 28 of the kiosk 10.

The illustrated disc storage system 14 includes a storage unit or drum 50 located within the enclosure 12 below the shelf 42. The storage unit 50 includes a plurality of horizontally disposed shelves 52 sized and shaped to support the uncovered media discs 16. The illustrated shelves 52 are sized and shaped to each hold a single uncovered media disc 16. The illustrated storage unit 50 is generally cylindrical or drum shaped have a vertically extending central longitudinal axis 54. The illustrated shelves 52 collectively encircle the central longitudinal axis 54. The illustrated shelves 52 are each closed at an outer side in the radial direction and open on an inner side in the radial direction so that the media discs 16 are inserted and removed from the shelves 52 within the storage unit 50.

Figure 9:
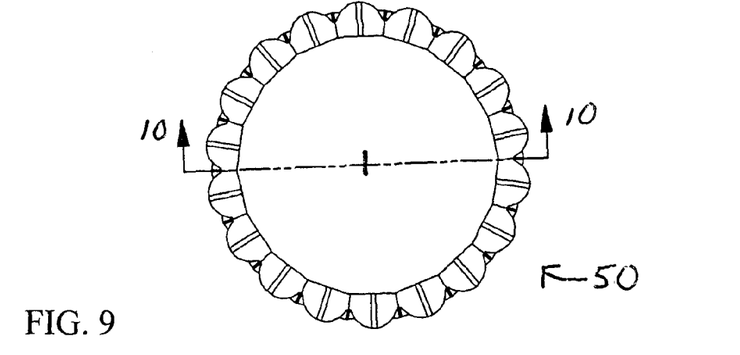
FIG. 9 is a storage drum of the kiosk of FIGS. 1 to 8.
Figure 10:
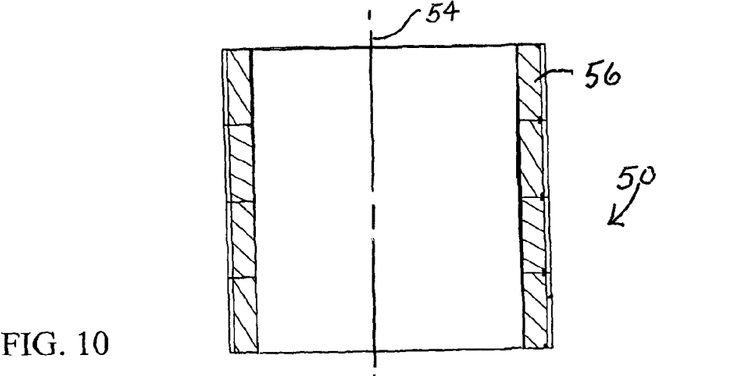
FIG. 10 is a sectional view taken along line 10-10 of FIG. 9.

As best shown in FIGS. 9 to 10, the illustrated storage unit 50 is formed by a plurality of storage segments 56. The illustrated storage unit 50 includes four annular rings of the segments 56 stacked one upon the other. Each illustrated ring includes nine of the segments 56 secured together side-by-side. Each illustrated segment 56 has forty shelves 52 for holding forty of the uncovered media discs 16 (best shown in FIGS. 11 to 13). Thus the illustrated storage unit 50 includes 2880 of the shelves 52 for a storage capacity of 2880 of the uncovered media discs 16. It is noted that any other suitable quantity of rings per unit 50, segments 56 per ring, or shelves 52 per segment 56 can alternatively be utilized. It is also noted that the storage unit 50 can alternatively be formed in any other suitable manner.

Figure 11:
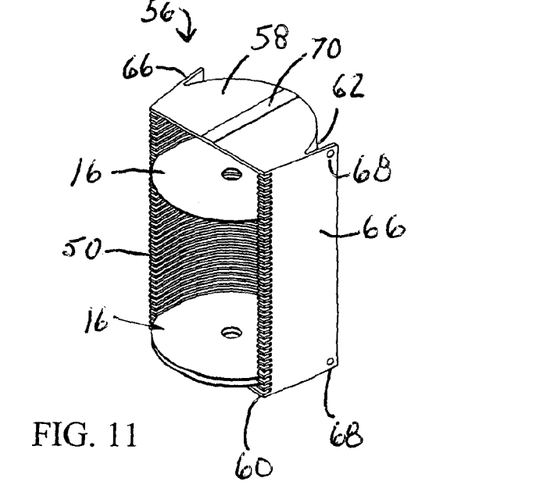
FIG. 11 is a perspective view of a single segment of the storage drum of FIGS. 9 and 10, wherein three discs are stored therein.
Figure 12:
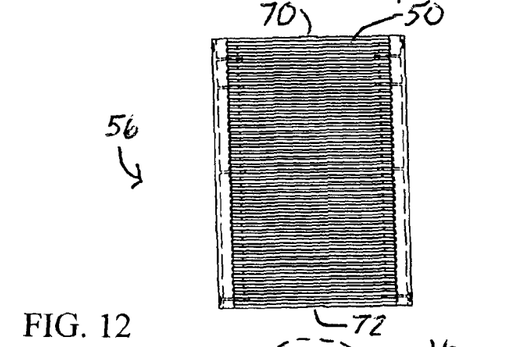
FIG. 12 is an elevational view of the single segment of FIG. 11, wherein the three discs are removed.
Figure 13:
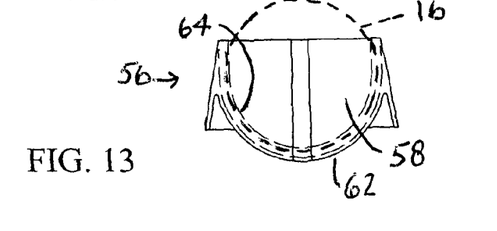
FIG. 13 is a top plan view of the single segment of FIGS. 11 and 12, wherein the three discs are removed.

As best shown in FIGS. 11 to 13, each segment 56 includes a top wall 58 and a bottom wall 60 with the shelves 52 vertically spaced apart therebetween. A side wall 62 extends between the top and bottom walls 58, 60 at the outer radial side and the lateral sides of the shelves 52 so that only the inner radial side of the shelves 52 is accessible. Each illustrated shelf 52 is formed by horizontally disposed a rim 64 extending inwardly from the side wall 62. The upper side of the rim 64 forms a horizontally extending, planar support surface for the media discs 16. The rim 64 is sized and shaped to engage only by a portion of the media discs 16 near their outer peripheries (best seen in FIG. 13). Supported in this manner, nearly the entire upper and lower surfaces of the media discs 16 remain engageable by the transfer system 20. Each rim 64 has a semi or half-circle shaped outer portion at the outer side of the segment 56 and straight inner portions inwardly extending in a tangential manner with ends of the rear portion. The illustrated shelves 52 are vertically spaced apart so that each shelf 52 can hold only one of the uncovered media discs 16. Each segment 56 also includes a pair of flanges 66 at opposed lateral sides of the segment 56 for engaging adjacent segments 56. The illustrated flanges 66 are provided with openings 68 for receiving mechanical fasteners to secure the segments 56 together. It is noted that the segments 56 can alternatively be secured together in any other suitable manner. The top and bottom walls 58, 60 of the segments 56 are provided with cooperating tongue and grooves 70, 72 for positioning adjacent rings of the segments 56 relative to one another. It is noted that the rings of the segments 56 can be secured together in any suitable manner. The segments 56 can be formed of any suitable material and in any suitable manner such as, for example, they can be molded of plastic.

Figure 14:
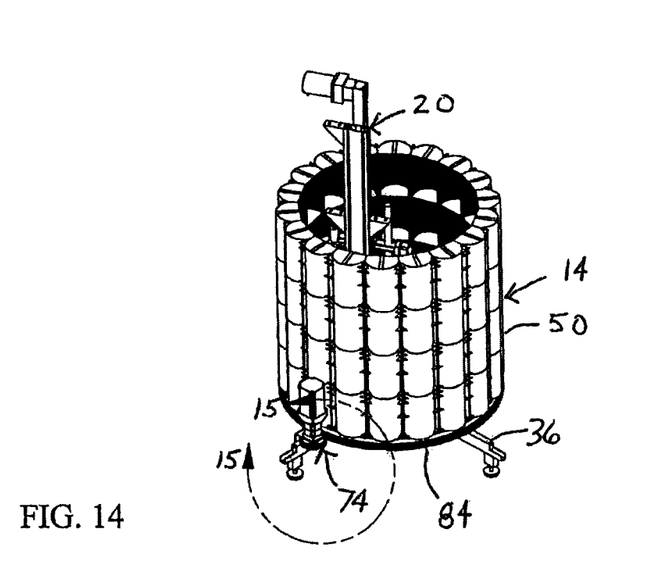
FIG. 14 is a perspective view of a drive system for the storage drum of the kiosk of FIGS. 1 to 13.
Figure 15:
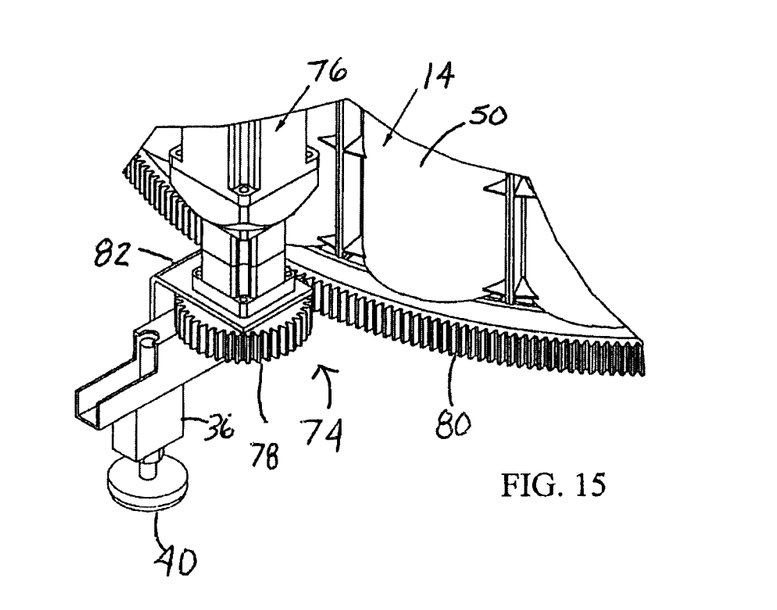
FIG. 15 is an enlarged, fragmented view taken from line 15-15 of FIG. 14.
Figure 16:
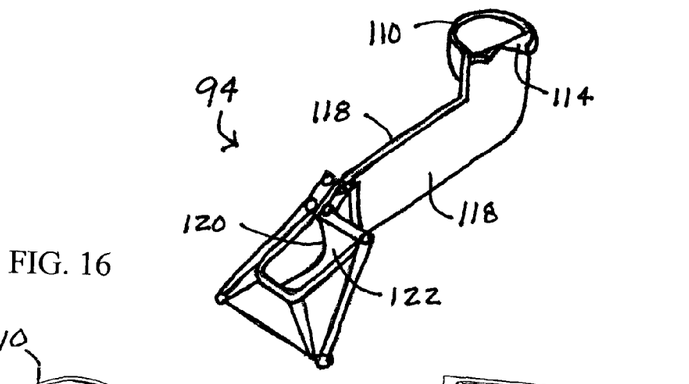
FIG. 16 is a perspective view of a dispensing chute of the kiosk of FIGS. 1 to 15.
Figure 17:
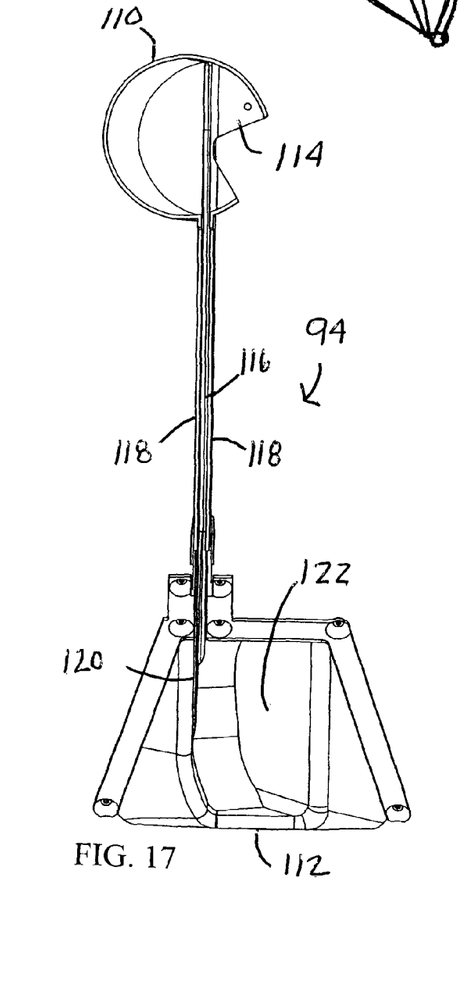
FIG. 17 is an enlarged top plan view of the dispensing chute of FIG. 16.
Figure 18:
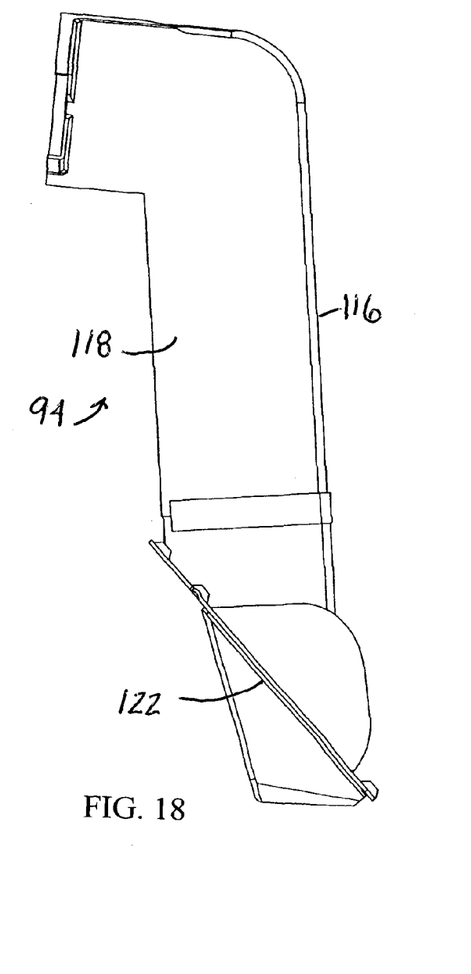
FIG. 18 is an enlarged elevational view of the dispensing chute of FIGS. 16 and 17.

As best shown in FIGS. 14 and 15, the illustrated disc storage system 14 also includes a drive assembly 74 for rotating the storage unit 50. The illustrated drive assembly 74 includes an electric motor 76, a drive pinion 78 rotated by the motor 76, and a ring gear 80 secured to the storage unit 50 and rotated by the drive pinion 78. The electric motor 76 can be of any suitable type for precisely positioning the storage unit 50 relative to the transfer system 20 as desired such as, for example, a stepper motor. The illustrated motor 76 is secured to the bottom structure with a mounting bracket 82 such that the output shaft of the motor 76 is vertically and downwardly extending. The drive pinion 78 is operably connected to the output shaft of the motor 76 in any suitable manner so that operation of the motor 76 rotates the drive pinion 78. A gear reduction assembly can be utilized therebetween if desired. The ring gear 80 is secured to the bottom of the storage unit 50 in any suitable manner such as, for example, mechanical fasteners. The illustrated storage unit 50 is supported by a large diameter bearing 84 located between the storage unit 50 and the bottom structure 36. Supported in this manner, the storage unit 50 is rotatable relative to the bottom structure 36 about is vertical central axis 54. The drive pinion 78 engages the ring gear 80 so that selective operation of the motor 76 rotates the storage unit 50. It is noted that the drive assembly 74 can alternatively have any other suitable configuration.

The illustrated disc identification system 18 includes an optical disc drive (ODD) or reader 86 for reading data recorded on the prerecorded media discs 16. When a prerecorded media disc 16 is inserted into the optical disc drive 86, the optical disc drive 86 is activated to read data recoded on the disc 16 which can be used to identify the disc 16. The optical disc drive 86 is in communication with the control system 24 to provide the identity of the disc 16. The optical disc drive 86 can be of any suitable type for reading the media discs 16. It is noted that more than one optical disc drive 86 can be provided and/or more than one type of optical disc drive 86 can be provided. For example, at least one DVD drive and at least one CD drive may be needed if the kiosk is adapted to dispense both DVDs and/or CDs so the kiosk can dispense movies, video games, and/or software. Also for example, at least one SD DVD drive and at least one HD DVD drive may be needed if the kiosk is adapted to dispense both standard definition and high definition DVDs. The illustrated kiosk 10 has four DVD optical disc drives 86 any other suitable quantity and/or type can alternatively be utilized. The illustrated optical disc drive 86 is located on the shelf 52 so that it is accessible by the disc transfer system 20 as described in more detail hereinafter. It is noted that any other suitable disc identification system 18 can be additionally or alternatively utilized such as, for example, a bar code reader, magnetic strip reader or the like can be utilized to read labels secured to the prerecorded media discs 16.

The illustrated disc transfer system 20 includes a first or upper transfer device or robot 88 for transferring media discs 16 between the holding locations 44, the optical disc drive 86, and a hand-off or transfer location 90 on the shelf 52 and a second or lower transfer device or robot 92 for transferring media discs 16 between the transfer location 90 and the storage unit 50 and from the storage unit 50 and to a discharge chute 94. The first and second transfer devices 88, 92 are each in operable communication with the control system 24 to locate each media disc 16 in a desired location. It is noted that the disc transfer system 20 can alternatively have any other suitable configuration.

The illustrated first transfer device or means 88 includes a vertically extending and rotatable support or rail 96, a horizontally disposed arm 98 vertically movable along the rail 96, and a gripper or grabber head 100 secured to the arm 98 and movable toward and away from the rail 96. Configured in this manner the head 100 can be selectively moved in three dimensions. The illustrated rail 96 is secured to the upper side of the shelf 52 and is positioned so that the gripper head 100 can move the media discs 16 between the holding positions 44, the transfer position 90, and the optical disc drive 86. The rail 96 has a height adequate to raise the media discs 16 above the rods 46. It is noted that the transfer position 90 is provided with holding rods 102 similar to the holding rods 46 of the holding positions 44 but they are much shorter in length because the media discs 16 are not stacked at the transfer location 90. The gripper head 100 can be of any suitable type to selectively grab and release a media disc 16 located on a stack of media discs 16 or on the shelf 52 at the holding locations 44 and the transfer location 90 on the shelf 52 and in the optical disc drive 86.

The illustrated second transfer device or means 92 includes a vertically extending stationary support or rail 104, a horizontally disposed arm 106 vertically movable along the rail 104, and a gripper or grabber head 108 secured to the arm 106 and movable toward and away from the rail 104. The illustrated rail 104 is positioned at the rotational axis 54 of the storage bin 50. The rail 104 extends the entire height of the storage unit 50 and extends above the storage unit 50 so that the arm 106 can be raised above the shelf 52 to the transfer location 90. The arm 106 is circumferentially aligned with the transfer location 90 so that the gripper head 108 can be moved toward and away from the transfer location 90 and is circumferentially aligned with an inlet 110 of the dispense chute 94 so that the gripper head 108 can be moved toward and away from the inlet 110 of the dispense chute 94. As the storage unit 50 is rotated in position and the arm 106 is raised and lowered, the arm 106 can be aligned with any one of the storage shelves 52 so that the gripper head 108 can be toward and away from the storage shelf 52 to insert or remove the media disc 16. The gripper head 108 can be of any suitable type to selectively grab and release a media disc 16 located on one of the storage shelves 52 and the transfer location 90 on the shelf 52.

The illustrated dispense chute 94 is sized and shaped to transfer an uncovered media disc 16 from the inlet 110 located within the enclosure 12 to an outlet 112 located outside the enclosure 12 at the front side 26 of the enclosure 12. The illustrated dispense chute 94 receives a horizontally oriented media disc 16 at the inlet 110 from the second transfer device 92, rotates the media disc 16 to a vertical orientation, and permits the media disc 16 to roll along its outer edge via gravity to the outlet 112 located outside the enclosure 12 for presentment to the consumer. The inlet 110 is sized and shaped to receive a horizontally-oriented uncovered media disc 16 therein from the second transfer device 92 and includes a lip or flange 114 at one side which cause the media disc 16 to rotate from the horizontal orientation to a vertical orientation via gravity when the media disc 16 is released by the second transfer device 92. Once rotated, the media disc 16 is supported on a support wall 116 which inclines down toward the outlet 114 so that the media disc 16 rolls down the support wall 116 on its edge via gravity. Side walls 118 are positioned on opposed sides of the support wall 116 to maintain the media disc 16 in its vertical orientation as it rolls down the support wall 116. The media disc 16 passes through a vertically oriented slit 120 as it exits the enclosure 12 and is presented to the consumer at a holding bin 122. The illustrated kiosk 10 also includes a sleeve dispensing device 124 wherein a protective sleeve is dispensed from the enclosure 12 through a horizontally extending slot 126 so that the consumer can insert the uncovered media disc 16 that is dispensed into the protective sleeve. The protective sleeve can be of any suitable type.

The illustrated user interface system 22 includes a touch video screen 128 and an audio system wherein audio visual information can be presented to the customer and the customer can input information to the control system 24 by touching the screen 128 at indicated positions and times. The illustrated user interface system 22 also includes a magnetic card reader 130 suitable for reading standard credit and debit cards of the consumer. The illustrated card reader 130 is located adjacent the touch video screen 128 but can alternatively be at any other suitable location. The illustrated user interface system 22 also includes a receipt printer 132 that prints and dispenses a transaction receipt to the consumer through a horizontal slot 134 in the enclosure 12. It is noted that the user interface system 22 can alternatively have any other suitable configuration.

The illustrated control system 24 includes suitable memory means, processing means and communication means for operating the various systems and components of the kiosk 10 in the desired manner. The illustrated control system 24 is operably connected to the drive assembly 74 of the disc storage system 14, the optical disc drive 86 of the disc identification system 18, the first and second transfer devices 88, 92 of the disc transfer system 20, the touch video screen 128, audio system, card reader 130, and receipt printer 132 of the user interface system 22, and the sleeve dispensing device 124.

To load the kiosk 10 with media discs 16, a desired quantity of uncovered media discs 16 are stacked into the holding stations 44. The controller 24 activates the first transfer device 88 to pick up one of the media discs 16 from one of the holding stations 44 and moves the media disc 16 to the optical disc drive 86. Once the media disc 16 is in the optical disc drive 86, the controller 24 activates the disc drive 86 so that the disc drive 86 reads at least a portion of the prerecorded information on the media disc 16 to provide the controller 24 with the identification of the media disc 16. The controller 24 activates the first transfer device 88 to pick up the media disc from the optical disc drive 86 and to move the media disc 16 to the transfer location 90. Once the media disc 16 is in the transfer location 90, the controller 24 activates the second transfer device 92 pick up the media discs 16 from one of the transfer station 90 and moves the media disc 16 to a desired location in the storage unit 50. The controller 24 stores in memory the location of the media disc 16 in the storage unit 50 for later dispensing or removal. The above process is continued until each of the loaded media discs 16 are identified and stored in the storage unit 50. Whenever t is desired to remove media discs 16 from the kiosk 10, the process is reversed to move desired media discs 16 from the storage unit 50 to the holding stations 44.

When a customer desires to obtain a media disc 16 from the kiosk 10, the customer interacts with the touch video screen 128 to select a desired media disc or discs 16. Once a media disc is selected, the controller 24 instructs the customer via the video screen 128 to swipe a credit or debit card in the magnetic card reader 130. Once swiped, the controller 24 obtains authorization for the transaction. If the transaction is authorized, the controller 24 activates the second transfer device 92 to retrieve the desired media disc 16 from the storage unit 50 and deposit the media disc 16 at the dispense chute 94. The dispense chute 94 receives the horizontally oriented media disc 16 at the inlet 110 from the second transfer device 92, rotates the media disc 16 to a vertical orientation so that the media disc 16 rolls along its outer peripheral edge via gravity to the outlet 112 located outside the enclosure 12 for presentment to the customer. The controller 24 also activates the receipt printer 132 to print a receipt of the transaction and dispense the receipt through the slot 134 to the customer. The controller 24 further activates the sleeve dispensing machine 124 to dispense a protective sleeve through the slot 136 to the customer. The customer can then pick-up the receipt, protective sleeve, and the media disc 16 and insert the media disc 16 into the protective sleeve.

Figure 19:
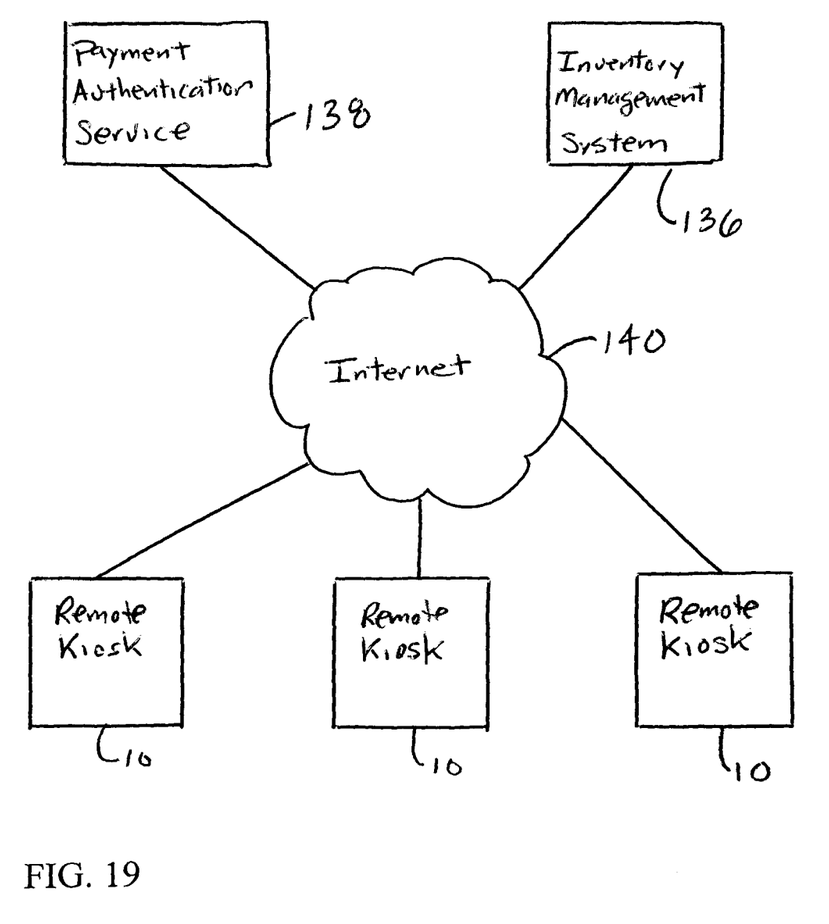
FIG. 19 is schematic view of a system of the kiosks of FIGS. 1 to 18.

As best shown in FIG. 19, the control system 24 of the kiosk 10 is also in communication with a central inventory management system 136 and a payment authentication service 138 via the Internet 140. It is noted that the communication can alternatively be by any other suitable means such as, the public switched telephone network, an intranet, or the like. The central inventory management system 136 automatically tracks and coordinates the inventory of the media discs 16 and transactions of the kiosks 10 in the distribution system. The inventory management system 136 is operably connected to the disc transfer system 20 of each kiosk 10 to selectively activate the disc transfer system 20 to move selected ones of the media discs from the disc storage system 14 to the holding stations 44 located outside the disc storage system 14 but within the kiosk 10 for manual removal from the kiosk 10. Once the kiosk 10 transfers and stacks the selected media discs 16 at the holding stations 44, an employee or agent etc. goes to the kiosk 10 to retrieve the selected discs 16 from the holding locations 44 through the access door. The selected discs are taken to a central location and resorted so that they can be manually taken back to selected kiosks 10 to redistribute the media disks among the kiosks. The media disks 16 are loaded into the kiosks 10 as described hereinabove. The inventory management system 136 is operably connected to each of the kiosks 10 to automatically activate transfer of selected media disks 16 between the kiosks 10 based on predetermined conditions such as transaction histories among the kiosks 10 and/or inventory levels among the kiosks 10. The inventory management system 136 is programmed to automatically determine which media discs 18 needs to be removed from the kiosks 10 and automatically directs the kiosks 10 to stack them up for manual removal. The inventory management system 136 reviews current inventory levels among the kiosks 10, determines the desired distribution among the kiosks 10 and then initates the transfer of media discs to obtain the desired distribution among the kiosks 10. The desired distribution places media discs 16 at locations which are most likely to give a positive return on investments. The inventory management system 136 determines which media discs 16 should be pulled from a kiosk 10 because the return on investment is less likely to be positive at that kiosk 10 than at another kiosk 10. Thus the inventory management system 136 looks at where all the media discs 16 in the system are located and where they should be and initiates transfer to get the discs where they should be for maximized return. For example, if kiosk A has too many copies of a DVD of Pirates II (there is a large quantity and/or a history of a low number of transactions for that particular DVD) and kiosk B does not have enough copies of the DVD of Pirates II (there is a low quantity of that particular DVD and/or a history of a high number of transactions for that particular DVD), the inventory management system 136 automatically initiates the transfer of a copy or copies of Pirates II from kiosk A to kiosk B. The payment authentication service 138 enables the kiosks 10 to authenticate the credit and debit cards of the consumers during transactions in a known manner.

Figure 20:
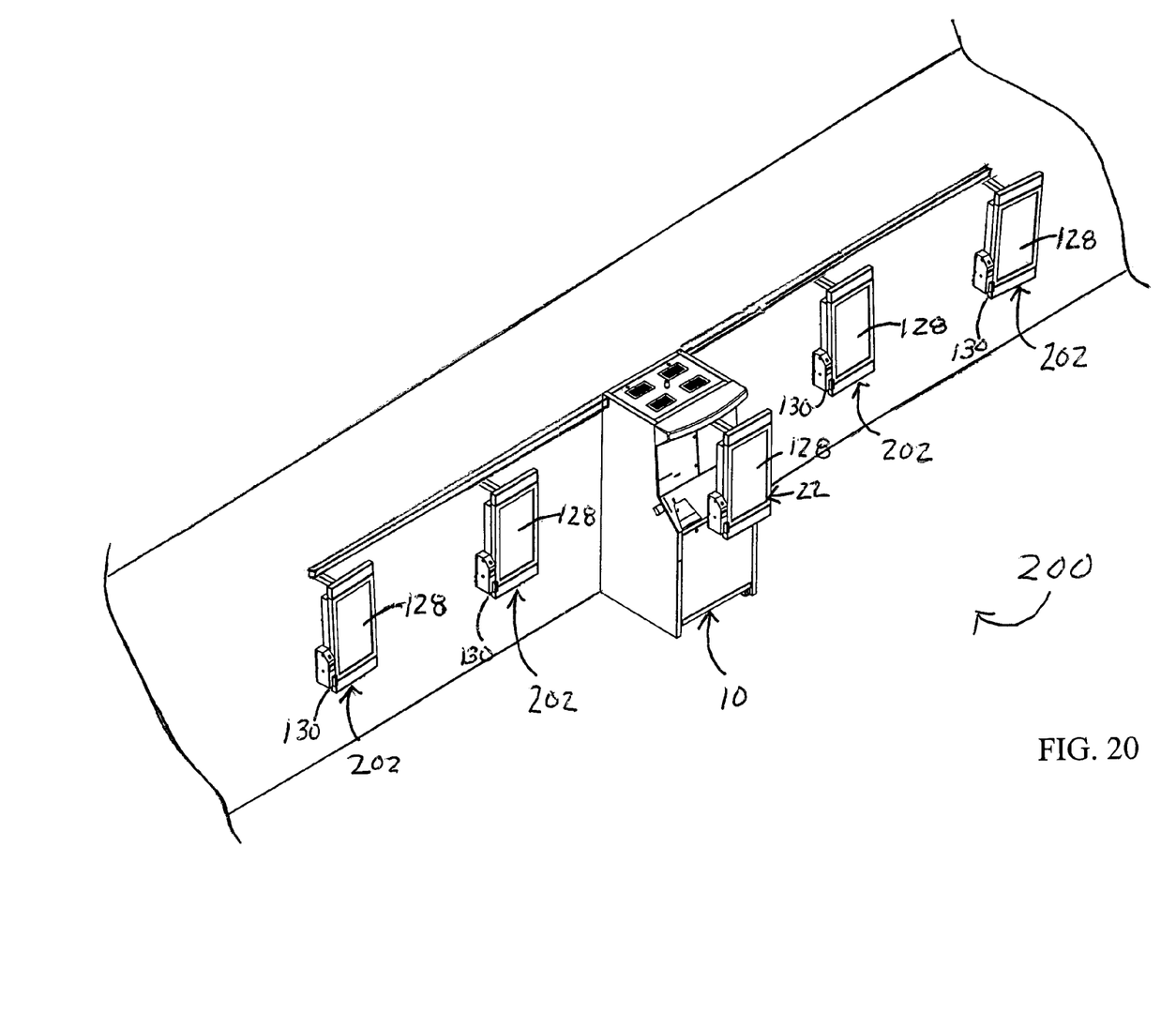
FIG. 20 is a perspective view of multi-interface system for the kiosk of FIGS. 1 to 19.

FIG. 20 illustrates a multi-interface kiosk system 200. The kiosk system 200 includes the kiosk 10 described hereinabove but the user interface system 22 also includes a plurality of content browsing and selecting stations 202 each including a touch video screen 128 and a card reader 130 which are operably in communication with the kiosk 10. It is noted that the interface stations can additionally include any other suitable user interface devices such as, for example, a bar code reader, keypad, or the like. Configured in this manner, a plurality of consumers can simultaneously browse media content, select media content, etc. at one of the user interface stations 202 and then go to the kiosk 10 to complete their transaction by receiving their media disc 16. Preferably, each station includes a receipt printer 132 which includes a code number or bar code which can be taken to the kiosk 10 by the customer so that the customer's media disc 16 is dispensed to the customer in the above described manner when the customer inputs the code or scans the bar code. The plurality of content browsing and selecting stations 202 prevents excessive waits for consumers caused by a single consumer browsing for an excessive period of time while minimizing the number of kiosks 10 that are needed at the location. While the illustrated stations 202 are located adjacent the kiosk 10, it is noted that the stations 202 can be located in any desired location such as, for example, the stations 202 could be located throughout a store with the kiosk 10 located near the exit or the stations 202 could be located outside a store such as near gas pumps with the kiosk 10 located within the store.

It is apparent from the forgoing that the present invention provides improved systems and methods can improve storage density of the kiosk 10, that is a greater quantity of media discs 16 can be stored without increasing the size of the kiosk 10, so that an increased number of media discs 16 can be stored within the kiosks 10. Additionally, the disclosed systems and methods can improve the ability of the kiosks 10 to have inventory that is likely desired by the consumers visiting that kiosk 10. Furthermore, the disclosed systems and methods can decrease the wait time of consumers at the kiosks 10.

From the foregoing disclosure and detailed description of certain preferred embodiments, it is also apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A dispensing system for dispensing media discs to users comprising, in combination:

a control system having a processor directing identification of a series of uncovered prerecorded media discs using an optical disc identification system to read identifying data from the series of uncovered prerecorded media discs and directing a disc transfer system to store the identified uncovered prerecorded media discs in desired assigned locations in a disc storage system with each said assigned location and identity of the content of the media disc stored in memory in the control system, a user interface system operably connected to the control system and including at least one browsing and selection station operable by a user, each said station having a listing of said media discs of different content stored in memory of the control system and prompting the control system to direct initiation of selection and dispensing of selected uncovered prerecorded media discs from a dispensing system in response to a user selection at a station, the control system also programmed to initiate the disc transfer system to move media discs selected by the user at a station of the user interface between the disc storage system and the dispensing system, and the disc transfer system comprising a first disc transfer device configured to transfer an uncovered prerecorded media disc from the optical disc identification system to a transfer location and a second disc transfer device configured to transfer the uncovered prerecorded media disc between the transfer location and the disc storage system, and wherein the first disc transfer device is further configured to transfer the uncovered prerecorded media disc from a stack in one of four holding locations to the optical disc identification system, wherein each holding location adapted to hold a different stack of the uncovered prerecorded media disks.

2. The dispensing system for dispensing media discs to users as claimed in claim 1, where each station of the user interface system includes a programmed touch video screen for use by the user for browsing and selecting uncovered prerecorded media discs from a dispense system in response to a user selection.

3. The dispensing system for dispensing media discs to users as claimed in claim 1, where the user interface system has a plurality of stations allowing a plurality of users to simultaneously browse and select from media content at the respective stations, with each station programmed to initiate browsing and selection of uncovered prerecorded media discs from the dispensing system in response to a user selection.

4. The dispensing system for dispensing media discs to users as claimed in claim 2, where the user interface system has a plurality of stations allowing a plurality of users to simultaneously browse and select from media content at the respective stations, with each station programmed to initiate browsing and selection of uncovered prerecorded media discs from the dispensing system.

5. The dispensing system for dispensing media discs to users as claimed in claim 1, where the dispensing system comprises a chute.

6. A multi-interface kiosk system for dispensing media discs to users upon payment therefor comprising, in combination:

a control system having a processor directing identification of a series of uncovered prerecorded media discs using an optical disc identification system to read identifying data from the series of uncovered prerecorded media discs and instructing a disc transfer system to store the identified uncovered prerecorded media discs of different content in desired assigned locations in a disc storage system with each said assigned location and identity of the content of the media disc stored in memory in the control system, a user interface system operably connected to the control system and including a plurality of browsing and selection stations operable by a user, each of said stations having a listing of said media discs of different content stored in memory of the control system and prompting the control system to direct dispensing a selected uncovered prerecorded media disc from a kiosk dispensing system in response to a user selection at a station, the control system also programmed to initiate a disc transfer system to move media discs selected by the user at a station of the user interface between the disc storage system and a kiosk dispensing system, and the disc transfer system comprising a first disc transfer device configured to transfer an uncovered prerecorded media disc from the optical disc identification system to a transfer location and a second disc transfer device configured to transfer the uncovered prerecorded media disc between the transfer location and the dispensing system, and wherein the first disc transfer device is further configured to transfer the uncovered prerecorded media disc from a stack in one of four holding locations to the optical disc identification system, wherein each holding location adapted to hold a different stack of the uncovered prerecorded media disks.

7. The multi-interface kiosk system for dispensing media discs to users as claimed in claim 6, where each station of the user interface system includes a programmed touch video screen and card reader for use by the users to initiate browsing and selection of uncovered prerecorded media discs from the kiosks dispense system in response to a user selection.

8. The multi-interface kiosk system for dispensing media discs to users as claimed in claim 6, where the user interface system has a plurality of programmed stations allowing a plurality of users to simultaneously browse and select from media content at the respective stations, with each station programmed to initiate browsing and selection of uncovered prerecorded media discs from the kiosks dispensing system in response to a user selection.

9. The multi-interface kiosk system for dispensing media discs to users as claimed in claim 7, where the user interface system has a plurality of programmed stations allowing a plurality of users to simultaneously browse and select from media content at the respective user interface stations, with each station programmed to initiate browsing and selection of selected uncovered prerecorded media discs from the kiosks dispensing system in response to a user selection.

10. The multi-interface kiosk system for dispensing media discs to users as claimed in claim 6, where the kiosk has a single kiosk dispense system.

11. The dispensing system for dispensing media discs to users as claimed in claim 2, where each station of the user interface system includes a card reader for reading a payment card.

12. The dispensing system for dispensing media discs to users as claimed in claim 11, where each station of the user interface system includes a receipt printer that prints and dispenses a transaction receipt.

13. The dispensing system for dispensing media discs to users as claimed in claim 1 wherein the second disc transfer device is further configured to transfer the media discs selected by the user from the disc storage system to the dispensing system.

14. The dispensing system for dispensing media discs to users as claimed in claim 1 where media discs to be removed from inventory are transferred from the disc storage system to the transfer location by the second disc transfer device and from the transfer location to a removal location by the first disc transfer device.

* * * * *